(12) United States Patent
Mayo et al.

(10) Patent No.: US 9,420,065 B2
(45) Date of Patent: Aug. 16, 2016

(54) PEER-TO-PEER SOFTWARE UPDATES

(71) Applicant: Google Inc., Mountain View, CA (US)

(72) Inventors: Peter Brian George Mayo, New Hamburg (CA); Donald Alfred Garrett, Mountain View, CA (US)

(73) Assignee: Google Inc., Mountain View, CA (US)

( * ) Notice: Subject to any disclaimer, the term of this patent is extended or adjusted under 35 U.S.C. 154(b) by 412 days.

(21) Appl. No.: 13/745,709

(22) Filed: Jan. 18, 2013

(65) Prior Publication Data

US 2014/0207844 A1 Jul. 24, 2014

(51) Int. Cl.
*H04L 29/06* (2006.01)
*H04L 29/08* (2006.01)
*G06F 9/445* (2006.01)

(52) U.S. Cl.
CPC *H04L 67/34* (2013.01); *G06F 8/65* (2013.01); *H04L 67/1068* (2013.01)

(58) Field of Classification Search
CPC ... H04L 67/34; H04L 41/0803; H04L 67/104; H04L 41/082; H04L 67/2842; H04L 67/288; H04L 41/0859; H04L 41/0866; H04L 41/0869; H04L 67/1063; H04L 67/109; H04Q 2213/13174; Y10S 707/99954; H04W 8/245; H04W 12/12; H04W 4/24; H04W 12/06; H04W 12/08; H04W 4/001; H04W 12/02; H04W 4/26; H04W 24/08; H04W 84/18; H04W 24/02; H04W 4/003; H04W 12/04; H04W 8/20; G06F 21/31; G06F 9/455; G06F 8/65; G06F 9/4416; G06F 17/30206; G06F 21/10; G06F 21/565; G06F 21/645; G06F 8/61; G06F 17/3089; G06F 19/3412; G06F 19/3468; G06F 21/53; G06F 8/60; G06F 8/68; G06F 9/5088; G06F 8/71; G06F 15/173; G06F 12/0897; G06F 17/30575; G06F 8/70

See application file for complete search history.

(56) References Cited

U.S. PATENT DOCUMENTS

| 7,558,860 | B2 | 7/2009 | Karnatz et al. | |
|---|---|---|---|---|
| 7,584,261 | B1* | 9/2009 | Teodosiu | G06F 8/60 709/217 |
| 7,630,381 | B1* | 12/2009 | Roskind | G06F 8/65 370/395.42 |
| 7,716,660 | B2 | 5/2010 | Mackay | |
| 8,924,952 | B1* | 12/2014 | Hou | G06F 8/665 710/1 |
| 2004/0006586 | A1 | 1/2004 | Melchione et al. | |
| 2004/0111505 | A1* | 6/2004 | Callahan | H04L 29/06 709/223 |
| 2006/0130037 | A1 | 6/2006 | Mackay | |
| 2006/0224670 | A1* | 10/2006 | Kubota | H04L 67/104 709/204 |
| 2007/0136297 | A1* | 6/2007 | Choe | G06F 21/57 |
| 2008/0130639 | A1 | 6/2008 | Costa-Requena et al. | |
| 2008/0133650 | A1* | 6/2008 | Saarimaki | G06F 8/65 709/203 |
| 2008/0209414 | A1 | 8/2008 | Stein | |
| 2008/0287058 | A1* | 11/2008 | Nahm | G06F 8/65 455/3.02 |
| 2011/0106886 | A1 | 5/2011 | Nolterieke et al. | |

\* cited by examiner

*Primary Examiner* — Kevin Bates
*Assistant Examiner* — Ranjan Pant
(74) *Attorney, Agent, or Firm* — McDermott Will & Emery LLP

(57) ABSTRACT

Various aspects of the subject technology relate to systems, methods, and machine-readable media for providing a software update. A system is configured to receive, from an update server, an update patch for a computer program installed on a memory of a first computing machine, execute the update patch on a first computing machine to update the computer program, receive a request for the updated computer program from a second computing machine, and transmit the updated computer program installed on the memory of the first computing machine to the second computing machine without transmitting the update patch.

19 Claims, 6 Drawing Sheets

PEER-TO-PEER SOFTWARE UPDATES

BACKGROUND

The present disclosure generally relates to updating computer software products and, in particular, providing software updates from an update server.

Software distributors often provide a software product, such as an operating system, firmware, or an application, to a large number of client machines. In some cases, the software product may be updated in order to, for example, fix a bug, address security issues, improve performance, or install a newer version. In order to update a software product installed on a client machine, the client machine may contact an update server over the Internet, identify which update patch is needed, download the update patch, and run the update patch on the software product.

SUMMARY

Various aspects of the subject technology relate to a system for providing a software update. The system includes one or more processors and a memory comprising instructions stored therein, which when executed by the one or more processors, cause the one or more processors to perform operations. The operations include receiving, from an update server, an update patch for a computer program installed on the memory, executing the update patch to update the computer program, receiving a request for the updated computer program from a peer computing machine, and transmitting the updated computer program installed on the memory to the peer computing machine, wherein the updated computer program transmitted to the peer computing machine is stored on a memory of the peer computing machine and configured to be used by the peer computing machine without an execution of the update patch.

Some aspects of the subject technology relate to a method for providing a software update. The method includes receiving, at a first computing machine, an update patch from an update server, the update patch for a computer program installed on a memory of the first computing machine, executing the update patch on the first computing machine, to update the computer program, receiving a request for the updated computer program from a second computing machine, and transmitting the updated computer program installed on the memory of the first computing machine to the second computing machine.

Other aspects relate to a machine-readable medium including instructions stored therein, which when executed by a machine, cause the machine to perform operations for providing a software update. The operations may include receiving a request for an updated computer program from a peer computing machine on a local area network, determining whether at least a portion of the updated computer program is installed on a memory device, and transmitting the updated computer program installed on the memory device to the peer computing machine, wherein the updated computer program transmitted to the peer computing machine is stored on a memory of the peer computing machine and configured to be used by the peer computing machine without an execution of the update patch.

Various aspects of the subject technology relate to a method for updating a computer program. The method includes contacting an update server to determine whether a computer program installed on the memory device is up to date, determining, if the computer program installed on the memory device is not up to date, whether at least one peer machine has an updated computer program available for retrieval, retrieving, if the at least one peer machine has the at least one portion of the updated computer program available for retrieval, the updated computer program from the at least one peer machine, and storing the updated computer program on a memory device.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding of the subject technology and are incorporated in and constitute a part of this specification, illustrate disclosed aspects of the subject technology and together with the description serve to explain the principles of the subject technology.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology.

A client machine may be configured to contact an update server over the Internet, identify a software update patch to update a software product (e.g., a computer program, an operating system, or other software) on the client machine, download the software update patch, and update the software product on the client machine by executing the software update patch. However, when there are a large number of client machines, having each client machine contact and download the update patch from an update server can require a significant amount of Internet bandwidth each time an update patch for the software product is released.

Various aspects of the subject technology relate to providing a software update in a peer-to-peer environment. According to some aspects, instead of transmitting an update patch that can be run on the client machine in order to update a computer program on the client machine, the entire updated computer program may be transmitted from one or more peer client machines to the client machine.

By retrieving the entire updated computer program instead of the update patch, a client machine is able to update the computer program without performing the additional step of executing the update patch. Furthermore, many update patches are configured to update one particular version of a computer program to another version. By transmitting the complete updated computer program instead of an update patch, a computing machine receiving the updated computer program does not need to check to see whether or not the update patch is able to update the current version of the computer program to a desired version of the computer program.

Figure 1:
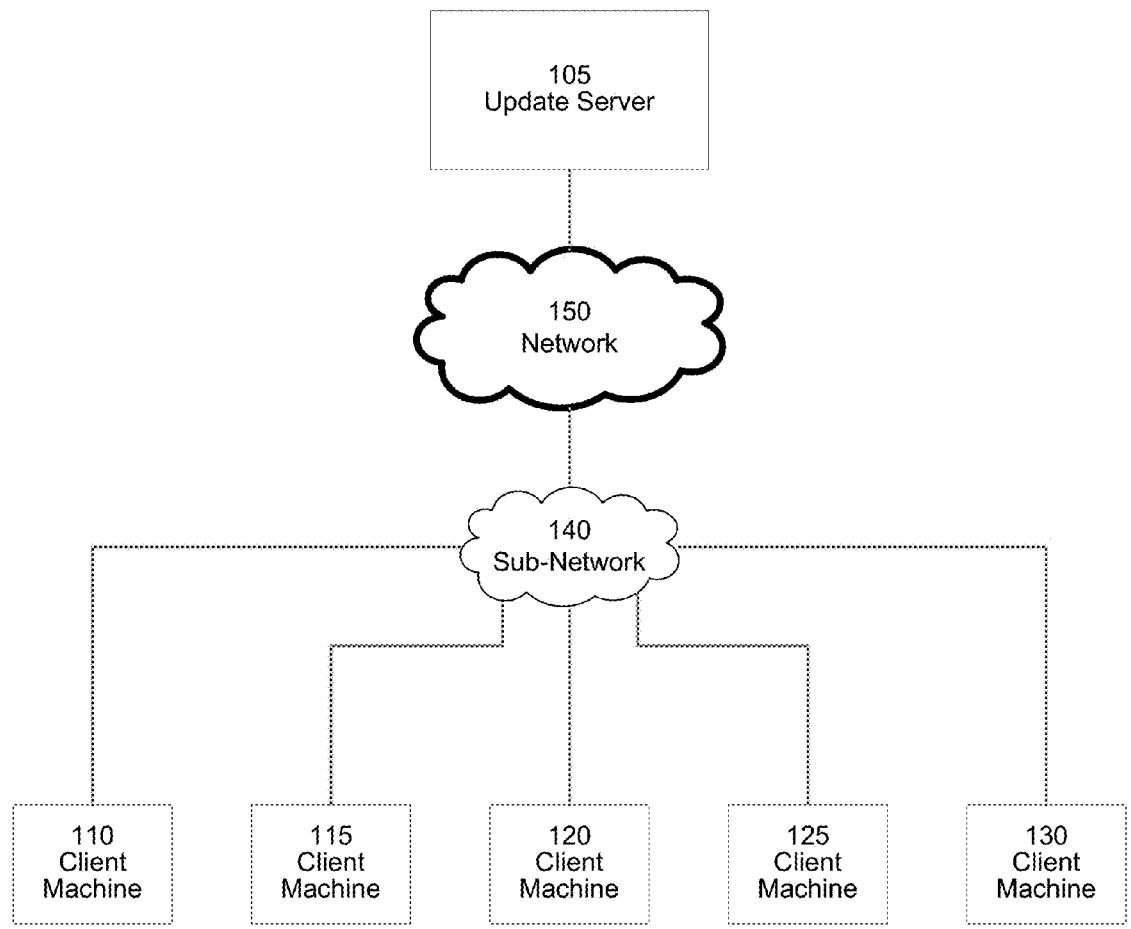
FIG. 1 is a conceptual block diagram illustrating an example peer-to-peer environment for providing a software update, in accordance with various aspects of the subject technology.

FIG. 1 is a conceptual block diagram illustrating an example peer-to-peer environment 100 for providing a software update, in accordance with various aspects of the subject technology. The peer-to-peer environment 100 includes an update server 105 and a number of client machines 110, 115, 120, 125, and 130 in communication via a network 150 such as the Internet. In the network environment 100, client machines 110, 115, 120, 125, and 130 may be considered peers or peer machines.

The network 150 may include, for example, any one or more of a cellular network, a satellite network, a personal area network (PAN), a local area network (LAN), a wide area network (WAN), a broadband network (BBN), the Internet, and the like. Further, the network 150 can include, but is not limited to, any one or more of the following network topologies, including a bus network, a star network, a ring network, a mesh network, a star-bus network, tree or hierarchical network, and the like.

In some aspects, one or more additional networks or sub-networks, such as sub-network 140 in FIG. 1, may also be used for communication between the update server 105 and the client machines 110, 115, 120, 125, and 130 as well as for communication among the client machines 110, 115, 120, 125, and 130. The sub-network may be, for example, a corporate network, a local area network (LAN), or a Wi-Fi network.

Figure 2:
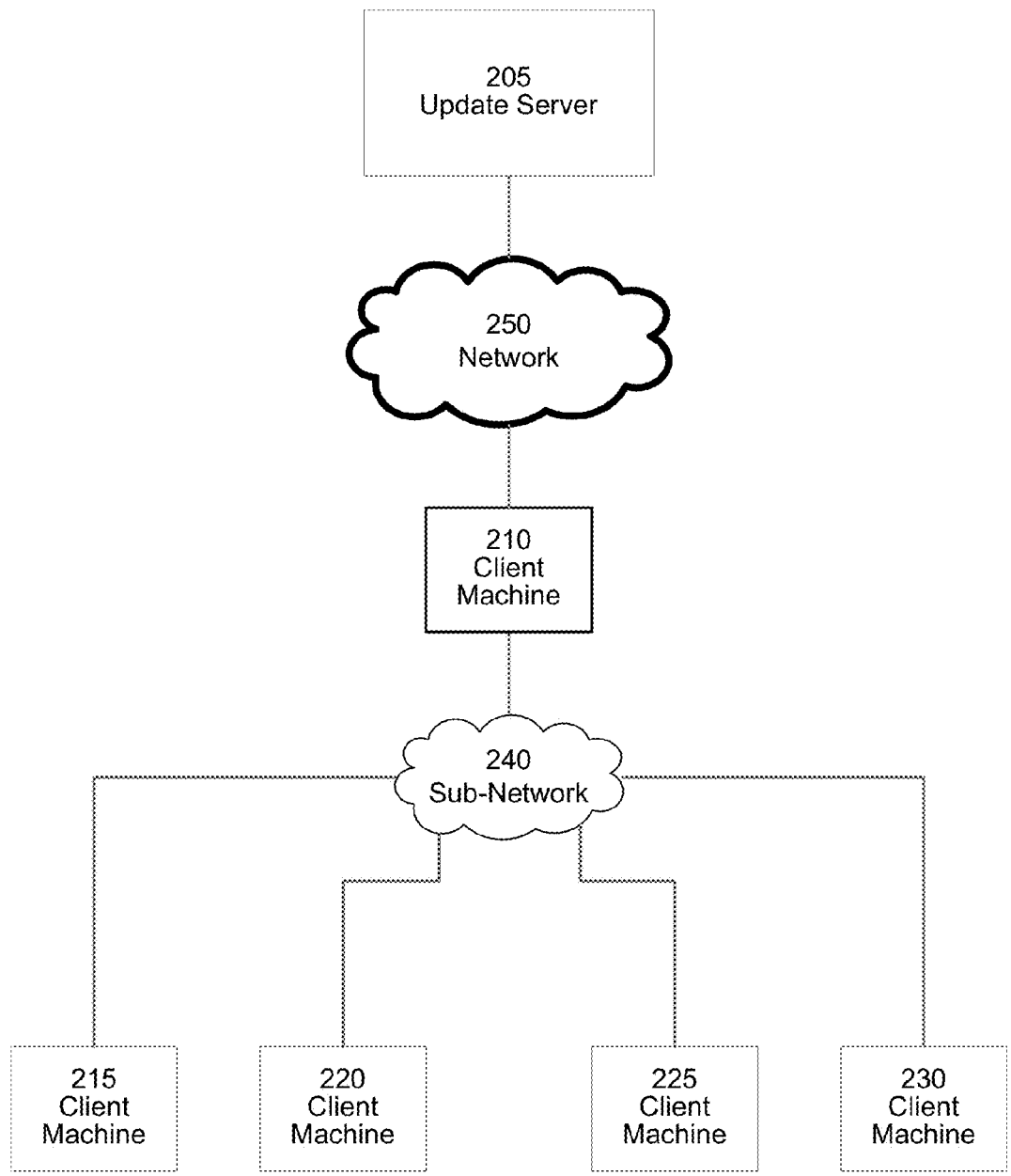
FIG. 2 is a conceptual block diagram illustrating another example peer-to-peer environment for providing a software update, in accordance with various aspects of the subject technology.

Although FIG. 1 illustrates one example network environment 100, other aspects of the subject technology may include other configurations. For example, FIG. 2 is a conceptual block diagram illustrating another example peer-to-peer environment 200 for providing a software update, in accordance with various aspects of the subject technology. The peer-to-peer environment 200 includes an update server 205 and a number of client machines 210, 215, 220, 225, and 230 in communication via a network 250 such as the Internet as well as a sub-network 240. In the network environment 200, client machines 215, 220, 225, and 230 are in direct communication with the sub-network 240, but are not directly in communication with the network 250.

Referring back to FIG. 1, client machines 110, 115, 120, 125, and 130 may include any computing machine capable of running a computer program or other software product and communicating with other computing machines. For example, a client machine may be a desktop computer, a laptop, a mobile device (e.g., a smart phone, tablet, personal digital assistant (PDA), a global positioning system (GPS) device, etc.), or any other machine with a processor, memory, and communications capabilities. Each client machine also includes one or more computer programs or applications installed on a memory (e.g., a hard disk drive) of the client machine.

The update server 105 may be a single system or machine or a virtual server made of a number of computing machines. The update server 105 may be configured to store one or more software updates (e.g., update patches) for software products installed on the client machines 110, 115, 120, 125, and 130. From time to time, software developers may upload a software update for a computer program onto the update server 105 in order to make the software update available to one or more of the client machines 110, 115, 120, 125, and 130.

In order to update an installed computer program, a client machine may be configured to contact the update server to determine whether or not a software update for the computer program is available and what version of the computer program the software update would update the computer program to. If a software update is available, the client machine may attempt to retrieve an updated version of the computer program from one or more of the client machine's peers. If the client machine is unable to retrieve the updated version, the client machine may download the software update from the update server 105 and update the computer program by executing the software update.

Figure 3:
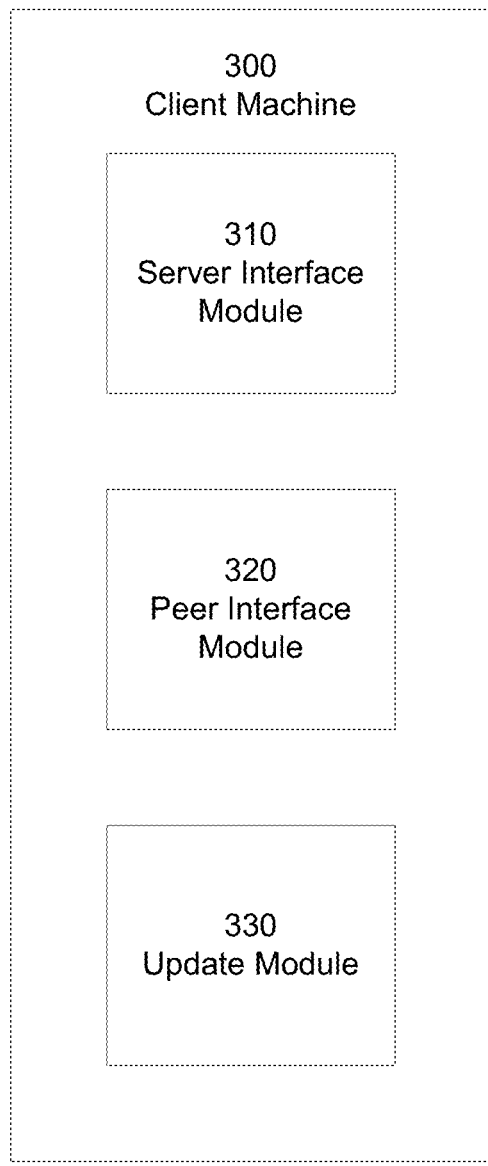
FIG. 3 is a conceptual block diagram illustrating an example client machine, in accordance with various aspects of the subject technology.

FIG. 3 is a conceptual block diagram illustrating an example client machine 300, in accordance with various aspects of the subject technology. The client machine 300 may include a server interface module 310, a peer interface module 320, and an update module 330. According to other aspects, however, the client machine 300 may include additional components, fewer components, or different components.

The server interface module 310 in FIG. 3 is configured to communicate with the update server 105 in order to determine whether an update for a software product (e.g., an operating system or another computer program) installed on the client machine 300 is available. The client machine 300 may be, for example, one of the client machines 110, 115, 120, 125, or 130 in FIG. 1 that is able to communicate with the update server 105. If an update is available, the peer interface module 320 is configured to contact one or more peer machines to determine whether the peer machines have the updated software product.

If one or more of the peer machines have the updated software product, the peer interface module 320 may retrieve the updated software product from the peer machines. The update module 330 may be configured to take any steps, if necessary, to enable the update software product retrieved from the peer machines to be used. If the peer interface module 320 is unable to obtain the updated software product from peer machines, the server interface module 310 is configured to retrieve an software update patch from the update server 105. The update module 330 can then update the software product installed on the client machine 300 by running the software update patch.

Figure 4:
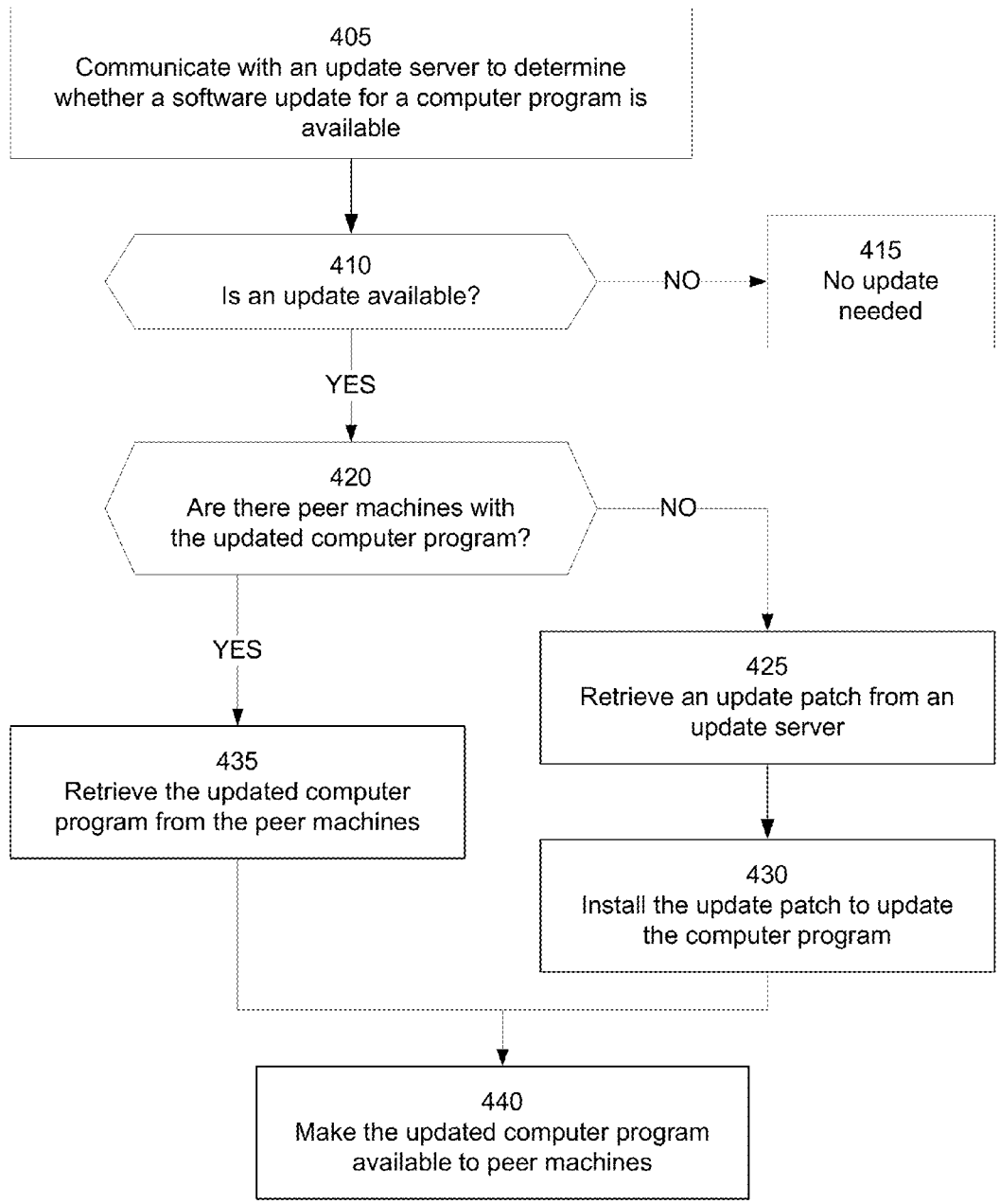
FIG. 4 is a flow chart illustrating an example process for providing a software update, in accordance with various aspects of the subject technology.

FIG. 4 is a flow chart illustrating an example process 400 for providing a software update, in accordance with various aspects of the subject technology. Although the blocks in process 400 are shown in one particular order, certain blocks may be executed in different orders or at the same time. Furthermore, although the blocks in the process 400 are described as being executed by the components of the client machine 300 of FIG. 3, the blocks are not limited to being executed by the components.

At block 405, a server interface module 310 of a client machine 300 communicates with an update server to determine whether a software update for a computer program (e.g., an operating system or other application) installed on the client machine 300 is available. At block 410, the update module 330 determines whether an update for the computer program is available. For example, the server interface module 310 may contact the update server periodically or when the computer program is opened and request information regarding the most recent version of the computer program or whether the version of the computer program on the client machine 300 is the most recent version.

If the update server responds indicating that the version of the computer program on the client machine 300 is the most recent version or if the update module 330 determines that there is no more recent version of the computer program available, at block 415, no update to the computer program installed on the client machine 300 is needed. If there is an update available from the update server, at block 420, the peer interface module 320 can check, at block 420, whether there are any peer machines that have the updated computer program available (e.g., the most recent version of the computer program).

A peer machine may have the updated computer program if it previously installed an update patch from the update server and run the update patch in order to update the computer program to the most recent version. Alternatively, the peer machine may have the updated computer program if it previously retrieved the updated computer program or portions of the updated computer program from one or more other peer machines. If the peer machine has at least a portion of the updated computer program, it may make those portions of the updated computer program available to other peer machines.

The peer interface module 320 can determine whether peer machines have the updated computing program by, for example, directly querying them, querying a central server, or checking to see if portions of the updated computing program is being sent via a broadcast, a multicast, or other multi-receiver mechanism that the client machine 300 may begin receiving.

If there are no peer machines that have the updated computer program, at block 425 the server interface module 310 can retrieve (e.g., download) from the update server, a software update patch configured to install the software update. After the software update patch is downloaded, at block 430, the update module 330 executes the software update patch in order to update the currently installed version of the computer program installed on the client machine 300 to the updated version of computer program.

The software update patch may include a number of instructions and data that can be used to update the computer program by, for example, copying files associated with the computer program onto a memory (e.g., a hard drive or a partition of a hard drive) of the computing system, deleting files on the memory, altering data on the memory, or a combination of these. After the software update patch is applied to the computer program on the computing machine, the updated computer program, rather than the update patch, is made available to other peer computing machines at block 440.

On the other hand, if there are one or more peer machines that have the updated version of the computer program, the peer interface module 320 can retrieve the updated computer program from the one or more peer computing machines at block 435. According to some aspects, the client machine and one or more of the peer machines may reside on the same sub-network (e.g., a local area network) and, in some cases, the bandwidth available on the sub-network may be greater than the bandwidth available to transmit data from the update server to the client machine.

According to some aspects, the updated computer program can be retrieved from the peer machines using peer-to-peer (P2P) techniques. For example, the updated computer program may be made of a number of data blocks and the peer interface module 320 can receive some data blocks for the updated computer program from one peer machine and other data blocks for the updated computer program from other peer computing machines. The data blocks for the updated computer program received from the peer machines may be put together at the client machine 300 to form the updated computer program. According to some aspects, as the data blocks for the updated computer program are received are received from the peer computing machines, they may also be made available to other peer computing machines at block 440.

Once the updated computer program is retrieved from the peer machines, the updated computer program is able to be used. Accordingly, the client machine 300 can use the updated computer program without running a software update patch. In some cases, however, a restart of the client machine may be needed in order to use the updated computer program. For example, if the updated computer program is a new version of an operating system, the new version of the operating system may be downloaded to a particular location (e.g., a specialized partition) on the client machine 300. In order to boot up from the new version of the operating system, the client machine 300 may be rebooted with instructions to boot from the new version of the operating system.

The updated computer program, according to some aspects, may be transmitted from the peer machines to the client machine 300 by transmitting an entire memory unit that the updated computer program is installed on. For example, if the updated computer program is installed on a particular hard drive partition on the a peer computing machine, the entire partition may be transmitted to the client computer machine 300. In other aspects, if the updated computer program is installed on a particular file system or a particular file folder, the entire file system or file folder may be transmitted to the client computer machine 300.

Figure 5:
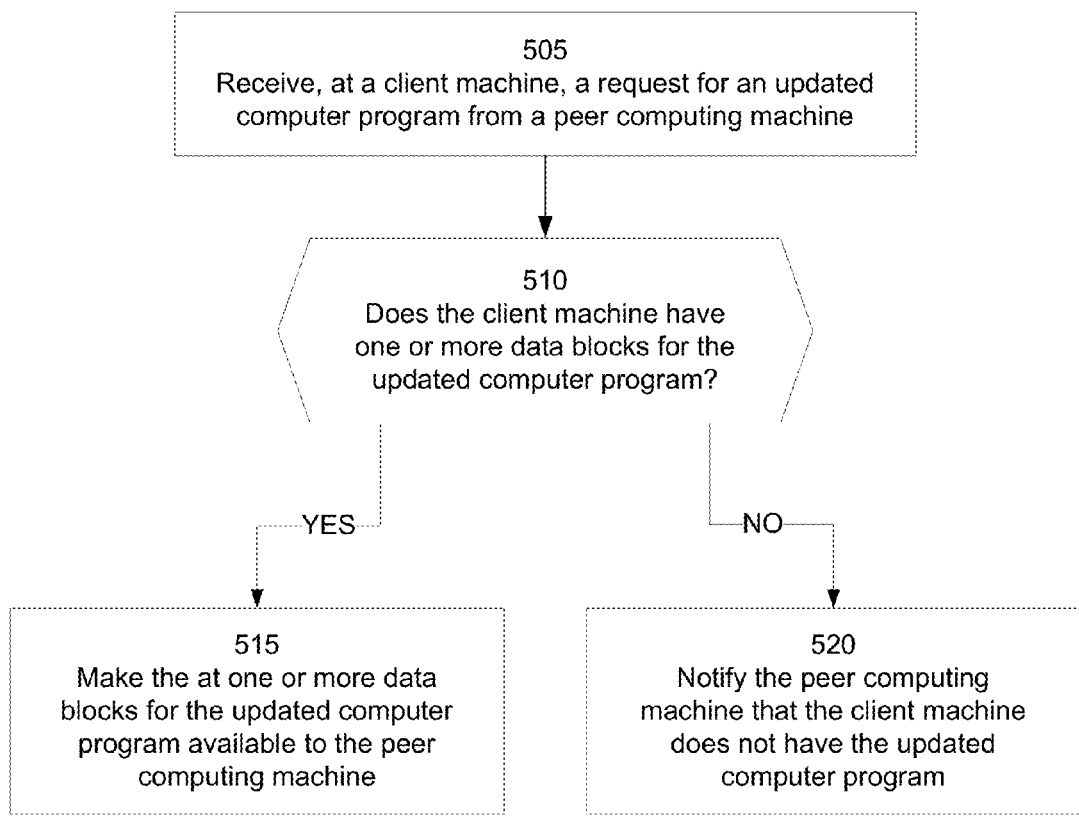
FIG. 5 is a flow chart illustrating an example process for making the updated computer program available to peer machines, in accordance with various aspects of the subject technology.

Similarly, the peer interface module 320 of the client machine 300 may also make the updated computer program available to other peer machines by transmitting data blocks for the memory unit that the updated computer program is installed on. For example, FIG. 5 is a flow chart illustrating an example process 500 for making the updated computer program available to peer machines, in accordance with various aspects of the subject technology. Although the blocks in process 500 are shown in one particular order, certain blocks may be executed in different orders or at the same time. Furthermore, although the blocks in the process 500 are described as being executed by the components of the client machine 300 of FIG. 3, the blocks are not limited to being executed by the components.

At block 505, the peer interface module 320 of the client machine 300 can receive a request for a an updated computer program from a peer computing machine. At block 510, the peer interface module 320 can check whether one or more data blocks for the updated computer program are stored on a memory (e.g., a hard disk drive) for the client machine. If the memory contains one or more data blocks for the updated computer program, the peer interface module 320 can make the one or more data blocks available to the peer computing machine at block 515 by, for example, transmitting the data blocks to the peer computing machine. If the memory does not have any data blocks for the updated computer program, the peer interface module 320 can notify the peer computing machine that the client machine does not have the updated computer program at block 520.

According to some aspects of the subject technology the data blocks may be transmitted to peer machines via a direct transmission or a broadcast or multicast to one or more other machines at the same time.

According to some aspects, the software update patch may be applied as it is being downloaded from the update server 105 and portions of the computer program that have been updated may be made available to other peer machines. Furthermore, a client machine, in some aspects, does not need to have the full updated computer program in order to share the portions of the updated computer program it has. For example, client machine A may have the full updated computer program and client machine B and client machine C need to acquire the updated computer program. Client machine B may receive the first half of the updated computer program from client machine A and client machine C may receive the second half of the updated computer program from client machine A. If client machine A leaves the network or is otherwise unreachable for some reason, client machine B and client machine C can share the portions of the updated computer program that each has with each other. Accordingly each is able to receive the other half from the other, thus receiving the full updated computer program.

Figure 6:
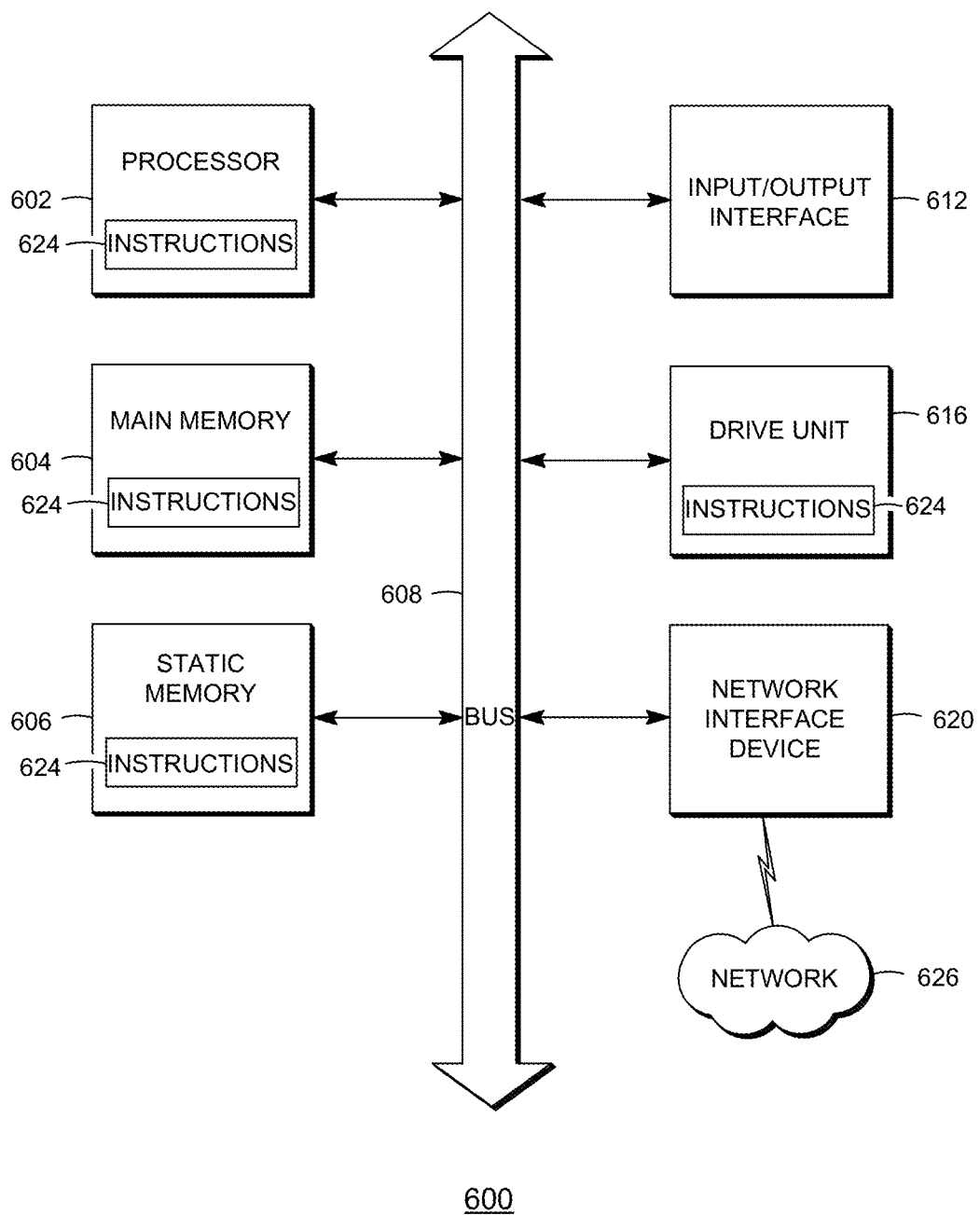
FIG. 6 is a block diagram illustrating a computer system with which any of the machines or servers described herein may be implemented, in accordance with various aspects of the subject technology.

FIG. 6 is a block diagram illustrating a computer system with which any of the machines or servers described herein may be implemented, in accordance with various aspects of the subject technology. In certain aspects, the computer system 600 may be implemented using hardware or a combination of software and hardware, either in a dedicated server, or integrated into another entity, or distributed across multiple entities.

The example computer system 600 includes a processor 602, a main memory 604, a static memory 606, a disk drive unit 616, and a network interface device 620 which communicate with each other via a bus 608. The computer system 600 may further include an input/output interface 612 that may be configured to communicate with various input/output devices such as video display units (e.g., liquid crystal (LCD) displays, cathode ray tubes (CRTs), or touch screens), an alphanumeric input device (e.g., a keyboard), a cursor control device (e.g., a mouse), or a signal generation device (e.g., a speaker).

Processor 602 may be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

A machine-readable medium (also referred to as a computer-readable medium) may store one or more sets of instructions 624 embodying any one or more of the methodologies or functions described herein. The instructions 624 may also reside, completely or at least partially, within the main memory 604 and/or within the processor 602 during execution thereof by the computer system 600, with the main memory 604 and the processor 602 also constituting machine-readable media. The instructions 624 may further be transmitted or received over a network 626 via the network interface device 620.

The machine-readable medium may be a single medium or multiple media (e.g., a centralized or distributed database, and/or associated caches and servers) that store the one or more sets of instructions. The machine-readable medium may include the drive unit 616, the static memory 606, the main memory 604, the processor 602, an external memory connected to the input/output interface 612, or some other memory. The term "machine-readable medium" shall also be taken to include any non-transitory medium that is capable of storing, encoding or carrying a set of instructions for execution by the machine and that cause the machine to perform any one or more of the methodologies of the embodiments discussed herein. The term "machine-readable medium" shall accordingly be taken to include, but not be limited to, storage mediums such as solid-state memories, optical media, and magnetic media.

Systems, methods, and machine-readable media for providing an encryption key to a user are provided. The system may include a key storage module, an interface module, and an authentication module. The key storage module may be configured to store an encryption key for a user on an encryption key server, wherein the encryption key is associated with storing user data on a data storage server. The interface module may be configured to receive a request for the encryption key from a client machine associated with the user. The authentication module may be configured to authenticate the user, wherein the interface module may further be configured to transmit the encryption key to the client machine in response to authenticating the user.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of example approaches. Based upon design preferences, it is understood that the specific order or hierarchy of steps in the processes may be rearranged. Some of the steps may be performed simultaneously.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A computer-implemented method for providing a software update, the method comprising:
    determining, by a first computing machine having a first version of a computer program, whether at least one peer machine has a second version of the computer program available for retrieval;
    receiving, at the first computing machine, in response to determining that the at least one peer machine does not have the second version of the computer program available for retrieval, an update patch from an update server, the update patch comprising a difference between the first version and the second version of the computer program;
    executing the update patch on the first computing machine, to update the computer program from the first version to the second version;
    receiving, at the first computing machine, a request for the second version of the computer program from a second computing machine; and
    transmitting the second version of the computer program from the first computing machine to the second computing machine.

2. The computer-implemented method of claim 1, further comprising:
    contacting, prior to the determining whether at least one peer machine has the second version of the computer program available for retrieval, the update server to determine whether the first version of the computer program is up to date.

3. The computer-implemented method of claim 1, wherein, in response to determining that the at least one peer machine has the second version of the computer program available for retrieval, the method further comprises:
    requesting the second version of the computer program from the at least one peer machine.

4. The computer-implemented method of claim 3, wherein the transmitting of the second version of the computer program to the second computing machine comprises transmitting, without transmitting the update patch, the entire content of a hard drive partition that has the second version of the computer program.

5. The computer-implemented method of claim 1, wherein the computer program is installed on a memory of the first computing machine and the memory of the first computing machine is a hard drive partition.

6. The computer-implemented method of claim 1, further comprising:
    indicating, subsequent to the executing of the update patch on the first computing machine, to the second computing machine that the second version of the computer program is available for transmission.

7. The computer-implemented method of claim 1, wherein the computer program is an operating system.

8. The computer-implemented method of claim 1, wherein the second version of the computer program transmitted to the second computing machine is stored on a memory of the second computing machine and used by the second computing machine without an execution of an update patch.

9. The computer-implemented method of claim 1, wherein the update patch is received via a first network and wherein the second version of the computer program is transmitted to the second computing machine via a second network.

10. A system for providing a software update, the system comprising:
    one or more processors; and
    memory comprising instructions stored therein, which when executed by the one or more processors, cause the one or more processors to perform operations comprising:
        determining whether at least one peer machine has a second version of a computer program available for retrieval, wherein the system has a first version of the computer program;
        receiving, in response to determining that the at least one peer machine does not have the second version of the computer program available for retrieval, from an update server, an update patch comprising a difference between the first version and the second version of the computer program;
        executing the update patch to update the computer program from the first version to the second version;
        receiving a request for the second version of the computer program from a peer computing machine; and
        transmitting the second version of the computer program to the peer computing machine, wherein the second version of the computer program transmitted to the peer computing machine is stored on a memory of the peer computing machine and configured to be used by the peer computing machine without an execution of the update patch.

11. The system of claim 10, wherein the operations further comprise:
    contacting, prior to the determining whether at least one peer machine has the second version of the computer program available for retrieval, the update server to determine whether the first version of the computer program is up to date; and second version of the computer program from the at least one peer machine in response to determining that the at least one peer machine has the second version of the computer program available for retrieval.

12. The system of claim 10, wherein the computer program is installed on a memory of the system and the memory is a hard drive partition and wherein the transmitting of the second version of computer program to the peer computing machine comprises transmitting the entire content of a hard drive partition that the-second version of the computer program is installed on.

13. The system of claim 10, wherein the operations further comprise:
indicating, subsequent to the executing of the update patch on the first computing machine, to the peer computing machine that the second version of computer program is available for transmission.

14. A non-transitory machine-readable medium comprising instructions stored therein, which when executed by a machine, cause the machine to perform operations comprising:
determining whether at least one peer machine has a second version of a computer program available for retrieval, wherein the machine has a first version of the computer program;
receiving, in response to determining that the at least one peer machine does not have the second version of the computer program available for retrieval, from an update server, an update patch comprising a difference between the first version and the second version of the computer program;
executing the update patch to update the computer program from the first version to the second version;
receiving, a request for the second version of the computer program from a peer computing machine on a local area network; and
transmitting the second version of the computer program to the peer computing machine, wherein the second version of the computer program transmitted to the peer computing machine is stored on a memory of the peer computing machine and configured to be used by the peer computing machine without an execution of the update patch.

15. The non-transitory machine-readable medium of claim 14,
wherein the operations further comprise:
contacting the update server to determine whether the first version of the computer program is up to date; and
determining, if the first version of the computer program is not up to date, whether at least one peer machine has at least one portion of the second version of the computer program available for retrieval.

16. The non-transitory machine-readable medium of claim 15, wherein the operations further comprise:
requesting, if at least one peer machine has the second version of the computer program available for retrieval, the second version of the computer program from the at least one peer machine.

17. A computer-implemented method for updating a computer program, the method comprising:
contacting, by a first computing device, an update server to determine whether a first version of a computer program installed on the first computing device is up to date;
determining, by the first computing device, if the first version of the computer program installed on the first computing device is not up to date, whether at least one peer machine has a second version of the computer program available for retrieval;
retrieving, by the first computing device, if the at least one peer machine has the second version of the computer program available for retrieval, the second version of the computer program from the at least one peer machine; and
storing the second version of the computer program on the first computing device.

18. The computer-implemented method of claim 17, wherein the second version of the computer program is configured to be used without an execution of an update patch.

19. The computer-implemented method of claim 17,
receiving, if no peer machines have the second version of the computer program available for retrieval, an update patch for updating the computer program from the first version to the second version on the first computing device from an update server; and
executing the update patch, wherein the update patch is configured to update the computer program from the first version to the second version on the first computing device.

* * * * *